United States Patent Office.

THEODORE GASSAWAY, OF BALTIMORE, MARYLAND.

MANUFACTURE OF STARCH.

SPECIFICATION forming part of Letters Patent No. 235,053, dated November 30, 1880.

Application filed June 24, 1880. (No specimens.)

*To all whom it may concern:*

Be it known that I, THEODORE GASSAWAY, of Baltimore city, State of Maryland, have invented certain new and useful Improvements in the Manufacture of Starch; and I hereby declare the same to be fully, clearly, and exactly described as follows.

My invention has reference to the manufacture of starch from the flour of wheat or other grain; and it has for its object to increase the yield of starch from a given weight of flour, and to improve the quality of product both of starch and gluten. These desirable ends are attained by the method of treatment hereinafter described, in which the use of ferments, heretofore deemed indispensable, is avoided.

In practice I subject the flour to violent agitation in any convenient receptacle, together with sufficient water to reduce the mass to the consistency of thin dough. For this purpose a covered trough provided with a longitudinal shaft carrying a series of radial beaters answers well. The effect of this preliminary beating or agitation is to partly agglomerate the gluten and in the same measure to free the starch. A charge of cold water is then added and the agitation continued for a short time, when the water is drawn off through a suitable strainer of sufficiently coarse mesh to admit of the passage of the suspended starch, while detaining the gluten. The latter is then again agitated with a second charge of water, which is drawn off as before and added to the first filtrate, and the process is repeated until the gluten is free of starch, about three washings generally sufficing. The starch is then allowed to subside, when the water is drawn off, and the starch is spread in thin layers on a surface, over which a current of air, dry and unheated—*i. e.*, at the natural temperature—is forced by means of a blower. The starch is thereby rapidly dried, without the deterioration in quality which attends the usual drying by heat.

The gluten is dried in the same way, when it is ready for comminution by any suitable crushing or grinding apparatus. Prepared in this way it has a rich, yellow color, is nearly transparent, and is admirably adapted for use as an article of food in admixture with flour or for the manufacture of macaroni.

The starch thus prepared is found to be absolutely pure, and superior, as well in appearance as quality, to the article as heretofore made.

The process is, moreover, a very expeditious one and cheaply carried out, its advantages being due to the avoidance of the use of ferments and artificial heat and the employment of small and successive charges of water in washing the gluten.

I am aware that it is not new, broadly, to desiccate or dry articles of food by forced blasts of dried air, and such I do not claim; nor do I claim here the described process of preparing gluten. It is incidentally set forth as attending my process of preparing starch, and will be made the subject of a separate application for Letters Patent.

What I claim is—

The process herein described of preparing starch, consisting in agitating a dough of flour and water with successive charges of cold water, filtering and decanting, and drying the product by means of a blast of air at the natural temperature, whereby, in avoiding the use of ferments and artificial heat, the quantity of product is increased and its quality is improved, substantially as set forth.

THEODORE GASSAWAY.

Witnesses:
R. D. WILLIAMS,
JOHN C. GITTINGER.